INVENTOR
LLOYD M. HAMMETT

July 23, 1968 L. M. HAMMETT 3,394,343
METHOD FOR DETERMINING TRAVEL TIME OF A SIGNAL
IN CONTINUOUS-WAVE SEISMIC PROSPECTING
Filed March 10, 1966 2 Sheets-Sheet 2

INVENTOR:
LLOYD M. HAMMETT
ATTORNEY:
CALVIN LAICHE

United States Patent Office 3,394,343
Patented July 23, 1968

3,394,343
METHOD FOR DETERMINING TRAVEL TIME OF A SIGNAL IN CONTINUOUS-WAVE SEISMIC PROSPECTING
Lloyd M. Hammett, Rte. 1, Box 701,
Slidell, La. 70458
Filed Mar. 10, 1966, Ser. No. 533,179
5 Claims. (Cl. 340—15.5)

ABSTRACT OF THE DISCLOSURE

The present invention pertains to geophysical exploration by continuous-wave seismic prospecting. More particularly, the present invention relates to an improved method for determining the travel time of a seismic energy signal between spaced apart geophones as commonly employed in geophysical exploration utilizing the technique known as cross-correlation of continuous-wave seismic energy signals.

Figure 1:
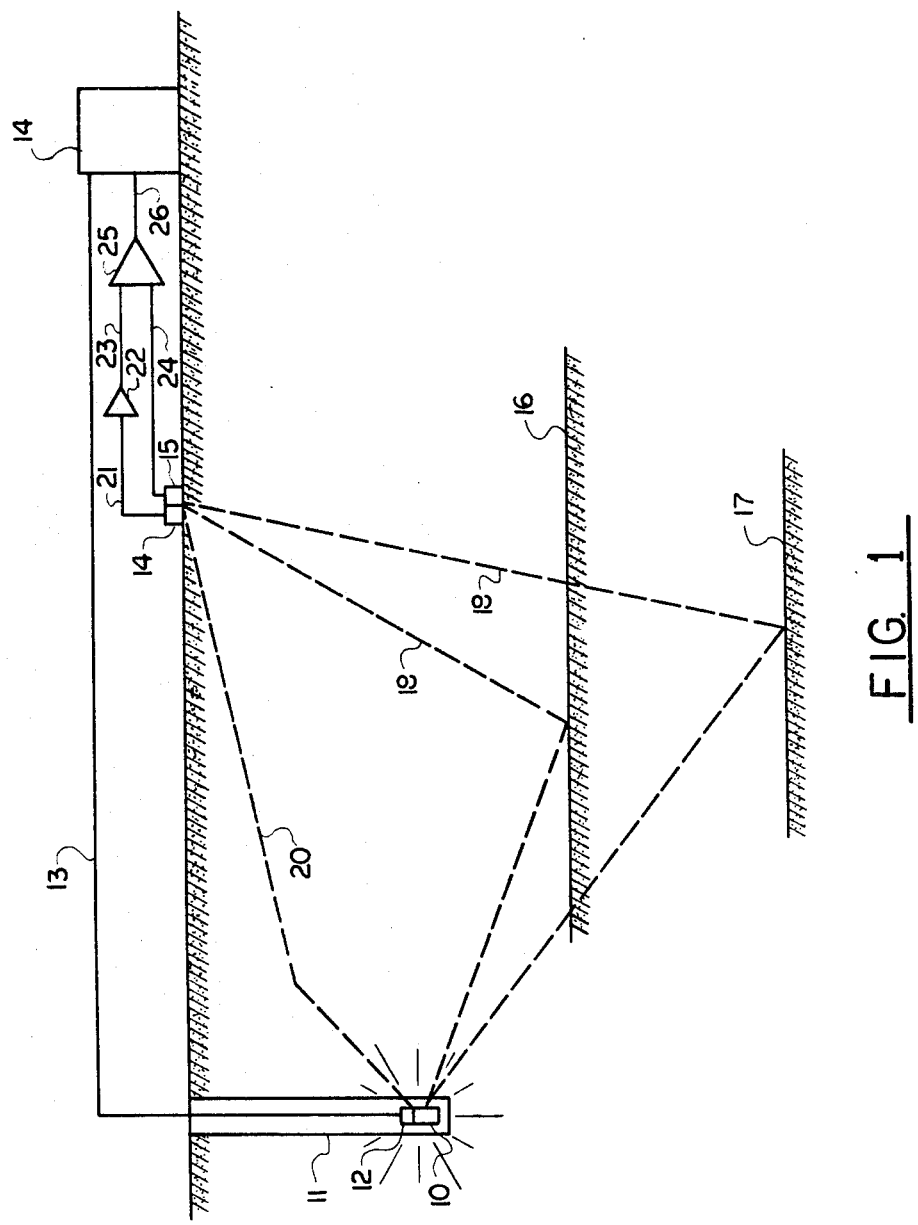

As is well-known, seismology is a most commonly employed method for determining the nature or composition of earth strata. In that technique, a shock pulse is generated and the vibrational energy travels to various strata and it is reflected or refracted and returned to the surface of the earth. Suitable equipment is employed to determine the total amount of travel of the reflected energy. There has been a constant strive in the art to improve the detection and measurement of such energy returning from the strata of interest. Recent improvements in the art have been directed to the use of continuous or semi-continuous wave seismic prospecting. In that procedure, a seismic signal is generated and transmitted over a period of minutes which allows the signal to be detected and analyzed more effectively. Improvements in that technique have involved the discrimination between components of a composite signal by cross-correlation of time series representative of the transmitted signals and a counterpart thereof. Due to the rather low ratio of the amplitude of the desired components of the composite signal to the amplitude of the undesired components of the signal, filtering of the time series representative of the received signal has been employed to remove frequency components of the composite signal that are more than a given number of cycles above and more than a given number of cycles below a given frequency. However, such narrow band filtering is difficult and leads to many inaccuracies due to the phase shift, filter ringing, and the partial elimination of desired information.

The principal object of the present invention is to provide a continuous seismic energy method of prospecting by accurately detecting and isolating the small signals of interest without alteration thereof whereby subsequent cross-correlation of the signals achieves results heretofore unobtainable in the art.

In its application to geophysical exploration for determining the travel time of a reflected signal between spaced apart geophone stations utilizing the technique known as cross-correlation, the present invention comprises the improvement of initially subtracting a low resolution component of the composite signal from the composite signal itself.

The present invention pertains to geophysical exploration by continuous-wave seismic prospecting. More particular, the instant invention relates to an improved method for determining the travel time of a seismic energy signal between spaced apart geophones in geophysical exploration utilizing the technique known as cross-correlation of continuous-wave seismic energy signals.

In geophysical exploration, seismology is a most commonly employed method for determining the nature or composition of earth strata. A shock pulse is generated and the vibrational energy travels to various strata and is reflected or refracted and returned to the surface of the earth. At the surface, spaced apart transducers or geophones record the moment of arrival of the reflected or refracted energy and its total time of travel. Additionally, the amplitude of the returning energy is measured.

There has been a constant strive in the art to improve the detection and measurement of the reflected signals returning from strata of interest within the earth. These signals are generally very small, especially in proportion to the large background noise signals. Increasing the small signals by merely inducing larger shock pulses has not proved entirely feasible inasmuch as the larger explosive charges commonly employed for such purposes are not only expensive, but additionally endanger nearby structure and marine life, particularly in the case of offshore exploration. Moreover, the normal background noise energy is still present and unchanged.

Other attempts in the art to improve the detection and measurement of extremely small reflected signals to improve the signal to noise ratio have been directed to improved means and methods for detecting such signals. For example, filtering has been employed to increase the signal to noise ratio by getting rid of noise having frequencies that are not in the band of desired signal frequencies. This is highly successful in many cases, but of little use if the unwanted signals have frequencies in the same band as the signals of interest. Moreover, filtering has the disadvantage of introducing phase shift in a signal which introduces error in recording the time of arrival of the signals of interest. Another approach is that known as stacking where several seismograms are recorded on magnetic tape simultaneously. Each seismogram is then played back simultaneously into a summing circuit. In such manner, the signal to noise ratio is improved because the signals add and the noise has a tendency to cancel out. However, the background noise coupled with the short duration of the signal still makes it extremely difficult to pinpoint the small signals of interest utilizing conventional forcing function means.

Recent improvements in the art have been directed to the use of continuous or semi-continuous wave seismic prospecting. In that procedure, the seismic signal is generated and transmitted over a period of minutes. This allows the signal to be detected and analyzed more effectively as opposed to the energy generated by an explosion which lasts for only a few microseconds. This technique is described in U.S. Patent No. 2,521,130. An improvement in that technique is described in U.S. Patent No. 2,688,124 which teaches the discrimination between components of a composite signal by cross-correlation of time series representative of the transmitted signals and a counterpart thereof. Heretofore to the present discovery, considerable difficulty has been encountered in cross-correlation of the time series representative of the transmitted and counterpart signals as a result of the rather low ratio of the amplitude of the desired components of the composite signal to the amplitude of the undesired components of the signal. An approach to solve this problem is described in U.S. Patent No. 3,015,086 which teaches filtering the time series representative of the received signal to remove frequency components of the composite signal that are more than a given number of cycles above and more than a given number of cycles below a given frequency. However, such narrow band filtering is difficult and leads to many inaccuracies due to the phase shift, filter ringing, and the partial elimination of desired information. Accordingly, a continuous-wave seismic method of prospecting employing cross-correlation whereby the small signals of interest are accurately detected, isolated, and recorded for subsequent integration would be a welcomed contribution to the art.

The principal object of the present invention is to provide a continuous seismic energy method of prospecting by accurately detecting and isolating the small signals of interest without alteration thereof whereby subsequent cross-correlation of the signals achieves results heretofore unobtainable in the art.

These and further objects will come to light as the discussion proceeds.

Figure 2:
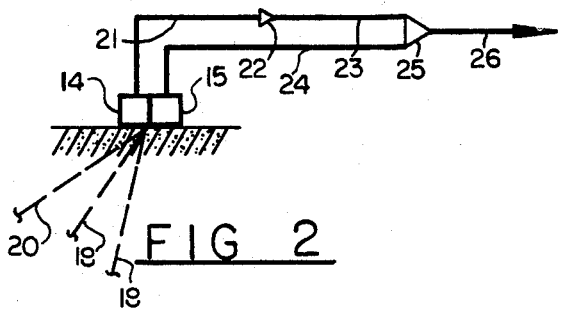
Figure 3:
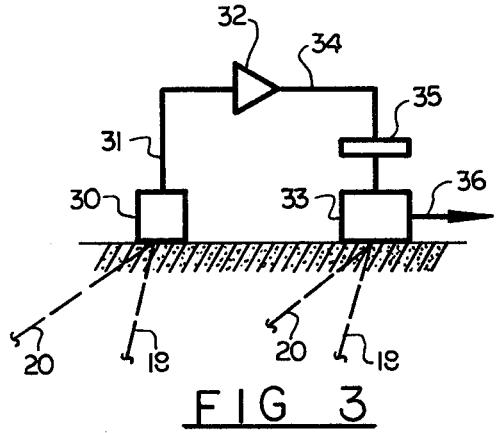
Figure 4:
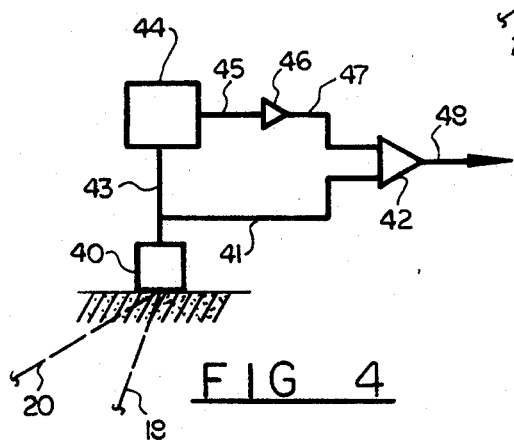
Figure 5:
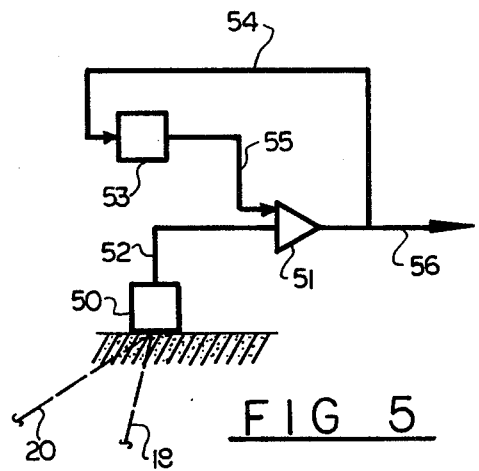

A complete understanding and appreciation of the present invention is had from the ensuing description in combination with the accompanying drawings wherein:

FIGURE 1 is a diagrammatic representation of a typical field set-up illustrating one manner in which the unique method of the instant invention can be employed in seismic exploration of the earth;

FIGURES 2, 3, and 4 represent other arrangements of equipment and circuitry for detecting and isolating reflected and refracted signals of interest; and FIGURE 5 represents a particularly preferred embodiment of yet another arrangement of equipment and circuitry for detecting and isolating reflected signals of interest.

In its application to geophysical exploration for determining the travel time of a reflected signal between spaced apart geophone stations utilizing the technique known as cross-correlation which comprises: (1) transmitting at a usable energy level at one of said stations by a forcing function a vibratory signal which comprises a continuous succession of non-repetitive energy pulses which are transmitted over a plurality of paths through the earth for a period of time at least as long as the time it takes said signal to travel over the longest desired path to another of said stations where it is detected as a composite signal comprising all levels of vibration; (2) recording a reproducible time series representative of said composite signal; (3) simultaneously and individually transmitting a forcing function counterpart signal of said transmitted vibratory signal; (4) individually recording a reproducible time series of said counterpart signal; (5) multiplying at least a substantial portion of said composite signal by said counterpart signal; (6) integrating for a suitable length of time the product of said multiplication while altering the time relationship between said composite signal and said counterpart signal during successive integrating periods; and (7) recording the values derived from such integration whereby the values realized serve as a measure of the amplitude of reflected or refracted energy and the time relationship between the composite signal and the counterpart signal serves as a measure of the travel time of the reflected or refracted energy; the present invention comprises the improvement of initially subtracting a low resolution component of the composite signal from the composite signal itself. By low resolution is meant that a portion of the composite signal that approximately describes only the larger components and does not describe (or is incapable of describing) the small or infinitesimal portions of the composite signal which is the reflected or refracted energy detected at the response geophone station spaced apart from the forcing transmitting geophone station. The high vibration level portion of the composite signal so realized is initially subtracted from the composite signal thereby leaving a low level signal that still contains the information contained in the small signals of interest which are cross-correlated pursuant to steps 1 through 7 above. The ratio of the amplitude of the desired components of the received or composite signal, namely the small signals of interest as reflected or refracted from a strata of interest in the earth, to the amplitude of the undesired components of the composite signal, namely the energy transmitted directly to the geophone station at higher levels and the high level background noise, is accordingly greatly increased. The net result is that the time series representative of the recorded small signal of interest realized as before mentioned can be easily and quickly cross-correlated with the time series representative of the directly transmitted counterpart signals of the composite signal whereby large random excursions of the cross-correlation function are virtually eliminated and the output signal more accurately defines the amount of energy arising at the geophone at any given value of shift of the time-relationship between the composite (transmitted) signal and the forcing function. Thus, the travel time of the signal of interest is more accurately and definitely determined.

Referring to FIGURE 1 in the drawings which shows a typical field set-up for the application of the unique method of the instant invention to geophysical exploration, suitable vibrator means for forcing function 10 for generating elastic vibration energy is positioned in the bore hole 11. The vibrator means 10 can be selected from a multitude of different devices which are commonly employed for applying a forcing function. For example, a hydraulic shaker attached to the surface end of a drill pipe and perhaps powered by the drilling fluid would be suitable. An adaptation of the hydraulic shaker attached to the bottom hole end of the drill pipe with a servo valve at the surface could also be suitable. Likewise, if the servo valve was positioned at the bottom of the hole. Additionally, an adaption of the hydraulic ram principal attached to the drill pipe or an eccentric flywheel attached to the drill pipe at the surface could be employed. Regardless of the means, the generated signal should be an elastic or seismic signal which continuously varies in frequency. In other words, the transmitted signal must be non-repetitive in that each energy impulse transmitted to the ground must have a slightly different period than that of the immediate preceding impulse and from that of the immediate following impulse, viz. the time series of impulses to be analyzed must consist of frequencies each of which has a different period. While the length of time that the signal must be transmitted is not critical, it should at least be transmitted over an interval of time such that the energy pulses multiplied by any unrelated function of time will approach zero as the time increases or for a period of time at least equal to that required for the signal to travel over the longest desired path, whichever is the greatest time interval. A suitable frequency and time range over which the vibrational energy may vary is for about 10 cycles per second to about 200 cycles per second for an interval of time of about 10 seconds to about 1000 seconds.

Positioned in close proximity to the vibrator means 10 is the geophone means 12. Upon motivation by the vibrator means 10 the geophone 12 produces an electrical signal representative of the forcing function or counterpart of the elastic wave signals transmitted into the earth by the vibrator means 10.

The counterpart signal from the geophone 12 is transmitted over the electrical lead 13 to the recording means 14. The latter can comprise any suitable means for subsequently reproducing an electrical signal, e.g. magnetic tape, magnetic drum, etc. The signal so recorded is preferably later cross-correlated with the adjusted composite signal as hereinafter discussed in detail. Of course, cross-correlation means may be employed in the field in combination with the recording means 14. In fact, the means 14 can be dispensed with and cross-correlation performed on the spot. However, that would not be as convenient as playing back and cross-correlating the recorded data at a later time which is preferred.

As brought out above, the objectives of the present invention are realized by subtracting a low resolution component, that is, a high level vibration which is incapable of describing the small or infinitesimal component of the composite signal, from the composite signal itself. This can be accomplished in numerous ways, some of which are shown in FIGURES 2, 3, 4, and 5.

With regard to FIGURE 2, which is the arrangement depicted in FIGURE 1, the geophones 14 and 15 positioned at a suitable distance from the vibrator means 10 are provided for detecting the continuous seismic energy reflected or refracted from various strata of interest beneath the earth, e.g. strata 16 and 17. The geophone means 14 is a low resolution geophone, that is, it is designed such that it is only capable of detecting the high vibration level portion of the composite signal received from the strata below. On the other hand, the geophone 15 is a high resolution transducer which is capable of detecting all vibration levels of the composite signal.

In operation for example, elastic vibration 18 is transmitted to the strata 17 where it is reflected or refracted to the surface of the earth where it is detected by the high resolution geophone 15. The geophones 14 and 15 also detect additionally high level vibrations such as the ground wave 20 which tend to hide and obscure the small signals 18. The geophone 14 detects only the low resolution component or high vibration level energy portion of the composite signal which is transmitted by the electrical lead 21 to the amplifier means 22. Simultaneously, the high resolution geophone 15 picks up all levels of vibration including the small signal 18 which is transmitted through the lead 24 to the summing means 25. By virtue of the summing means 25, the high level vibration component of the composite signal is cancelled upon addition of the amplitude adjusted low resolution signal picked up by geophone 14 to the composite signal picked up by the geophone 15. In this manner, only the small signals of interest are transmitted via the lead 26 to the recorder means 14 shown in FIGURE 1. Thereafter, the isolated small signals of interest are multiplied by the forcing function counterpart signal and the resultant product integrated while altering the time relationship of the signals to produce an indicia of the travel time of the composite signal.

It is to be understood that pursuant to the above operation that the forcing function and the response signals can be, of course, recorded either in the form of displacement, velocity, or acceleration. The only limitation being that both forcing function and the response signals be in the same form at the time the cross-correlation is performed.

In the embodiment of FIGURE 3, the small signals of interest are isolated in a mechanical fashion. For example, the composite signal comprising 18 plus 20 is detected by the low resolution geophone 30. The low resolution geophone 30 detects only the high vibration level portion of the composite signal which is transmitted over the lead 31 to the amplifier means 32. The amplitude of the low resolution signal is adjusted by virtue of the amplifier 32 to equal the high level vibration energy portion of the composite signal 18 and 20 as received by the high resolution geophone 33. The amplitude adjusted signal from the amplifier means 32 is transmitted through the lead 34 to the transducer 35. The latter is in turn mechanically linked to the seismic mass in the geophone 33. In this manner, the high vibration level energy portion of the composite signal 18, as detected by the geophone 33, is simultaneously cancelled out by virtue of the action of the transducer 35, thereby leaving only the small signals of interest which are transmitted through the lead 36 to the recording means 14 where they are multiplied and integrated in the same fashion as discussed above with regard to FIGURE 2.

FIGURE 4 represents yet another manner in which a low resolution component of the composite signal can be isolated and subsequently subtracted from the composite signal. In FIGURE 4, which represents a particular preferred embodiment, the composite signal 18 is detected by the high resolution geophone 40. The composite signal is then transmitted through the lead 41 to the summing means 42. The composite signal is simultaneously routed through the low resolution circuit means 44. There are many well known means and corresponding methods in the art today for extracting a low resolution signal from a composite signal that can be employed to accomplish the function of the low resolution circuit means 44 as shown in FIGURE 4. Probably the most obvious is to feed the signals through an analog to digital converter and through a digital to analog converter. The low resolution means 44 in response to the composite signal generates a low resolution component of the composite signal. The component which represents a high vibration level energy component of the composite signal is then transmitted to the amplifier 46 where its amplitude is adjusted to that of the high vibration level energy component of the composite signal transmitted through the lead 41 to the summing means 42. The low resolution component of the composite signal, when added to the composite signal itself by action of the summing means 42, cancels out similar high energy levels whereby only the small signals of interest remain. The latter are then transmitted through the lead 48 to the means 14 for recording and subsequent cross-correlation in the same manner as above discussed with regard to FIGURES 2 and 3. In this manner, the large amplitude signal portion of the composite signal which tends to impede cross-correlation of the directly transmitted counterpart signal with the composite signal is very efficaciously eliminated whereby the signal to noise ratio during subsequent cross-correlation is thereby significantly improved than heretofore obtainable by prior art techniques.

A particularly preferred procedure for isolating the low resolution component of the composite signal is that as shown in FIGURE 5. The composite signal (signals 18 and 20 for example) is received by the geophone 50 which is a high resolution transducer. Its output is transmitted to the amplifier 51 via the lead 52. The low resolution circuit means 53 comprising comparator and integrator means is connected across the amplifier 51 by virtue of the leads 54 and 55 in a negative feedback loop. By the latter is meant the feeding back of the output signal 56 of the amplifier 51 to the low resolution circuit means 53, the output of which, in turn, is fed to the amplifier 51 whereby the high vibration level component of the composite signal is eliminated, thereby leaving the small signals of interest. The flow of these small signals approach a steady state condition by virtue of the counterbalancing action of the feedback loop.

Moreover, the various means disclosed above can be substituted or replaced by other functionally equivalent means that are also well known in the art. For example, the feedback signal may consist of a mixture of a portion of the low resolution signal plus a low resolution portion of derivatives and integrals of the composite signal. The use of various orders of derivatives and integrals in feedback circuits is well known in the field of servomechanisms. The various components discussed above with regard to the specific circuit arrangements of FIGURES 2, 3, 4, and 5 are for explanation purposes only and their specific structure does not form a subject of this invention. The basis of these components is the operational amplifier. This is a high gain amplifier capable of working frequencies from D.C. or 0 cycles per second up to many thousand cycles per second. The summing means referred to above is an operational amplifier with a feed back resistor ($R_F$) connecting the output to the input. Other input signals are fed to the amplifier through input resistors ($R_{I_1}$, $R_{I_2}$, etc.). The output voltage ($E_o$) is then equal to the sum of the respective voltages (e.g. $E_1/R_{I_1}$, $E_2/R_{I_2}$, etc.) across each input resistor divided by the respective resistor multiplied by the feed back resistor, or $$E_o = R_F \left[ \frac{E_1}{R_{I_1}} + \frac{E_2}{R_{I_2}} \right]$$

The integrator means referred to above is a operational amplifier that uses a capacitor (C) in the feed back loop instead of the resistor ($R_F$). Thus, the output ($E_o$) becomes $$E_o = \frac{1}{(R_I)C}\int E_{IN}$$

where $E_{IN}$ is the input voltage.

The comparator means is an operational amplifier whose feedback resistor is replaced by a diode and whose input or output is biased to some predetermined value. Thus, its output will be either 0 or a maximum depending upon its input or the relationship between the input and bias valves.

Means for cross-correlating the forcing function counter-part signal and the isolated signal of interest can consist of a multiplier and an integrator (both as described above) in combination with means for delaying a signal for a predetermined time, e.g. by use of tape loops, magnetic drums, digital delay lines, or the like.

It is to be understood that the above low resolution circuits can be revised considerably without departing from the true spirit of the instant invention. For example, in the case of the circuit arrangement of FIGURE 3, additional amplifier means and summing means can be judicially added to the circuit to enhance the response and reliability of the system in certain instances.

I claim:

1. In a geophysical exploration method for determining the travel time of a reflected signal between spaced apart geophone stations by:
   (1) transmitting at a usable energy level at one of said stations by a forcing function a vibratory signal which comprises a continuous succession of non-repetitive energy pulses which are transmitted over a plurality of paths through the earth for a period of time at least as long as the time it takes said signal to travel over the longest desired path to another of said stations where it is detected as a composite signal comprising all levels of vibration;
   (2) recording a reproducible time series representative of said composite signal;
   (3) simultaneously and individually transmitting a forcing function counterpart signal of said transmitted vibratory signal;
   (4) individually recording a reproducible time series of said counterpart signal;
   (5) multiplying at least a substantial portion of said composite signal by said counterpart signal;
   (6) integrating for a suitable length of time the product of said multiplication while altering the time relationship between said composite signal and said counterpart signal during successive integrating periods; and
   (7) recording the values derived from such integration whereby the values realized serve as a measure of the amplitude of reflected or refracted energy and the time relationship between the composite signal and the counterpart signal serves as a measure of the travel time of the reflected or refracted energy; the improvement which comprises:
   initially subtracting a low resolution component of said composite signal from said composite signal by:
      (1) first detecting said composite signal with a high resolution geophone whereby all vibrational levels of said signal are detected;
      (2) providing a low resolution component of said composite signal;
      (3) adjusting the amplitude of the low resolution component of said composite signal until it is equal to the high vibration level portion of said composite signal; and
      (4) summing said composite signal and the adjusted low resolution component of said composite signal whereby the high vibration energy level portion of said composite signal is cancelled out.

2. The method of claim 1 further characterized in that said low resolution component of said composite signal is subtracted from said composite signal by:
   (1) detecting said composite signal with a high resolution geophone whereby all vibrational levels of said signal are detected;
   (2) transmitting said composite signal to summing means which is connected in series with means for isolating a low resolution component of said composite signal;
   (3) feeding a portion of the output signal of the summing means to means for isolating high vibrational energy levels when present in the output signal of the summing means; and
   (4) transmitting the isolated high vibrational energy level to the summing means whereby the high vibrational energy level portion of the composite signal detected by the high resolution geophone is cancelled out leaving only the low vibrational energy level of said composite signal.

3. The process of claim 1 further characterized in that said low resolution component of said composite signal is subtracted from said composite signal by:
   (1) first detecting said composite signal with a high resolution geophone whereby all vibrational levels of said signal are detected;
   (2) simultaneously detecting a low resolution component of said composite signal with a low resolution geophone;
   (3) adjusting the amplitude of the low resolution component of said composite signal until it is equal to the high vibration level portion of said composite signal; and
   (4) summing said composite signal and the adjusted low resolution component of said composite signal whereby the high vibration energy level portion of said composite signal is cancelled out.

4. The method of claim 1 further characterized in that said low resolution component of said composite signal is subtracted from said composite signal by:
   (1) first detecting said composite signal with a high resolution geophone whereby all vibrational levels of said signal are detected;
   (2) simultaneously detecting a low resolution component of said composite signal with a low resolution geophone;
   (3) adjusting the amplitude of the low resolution component of said composite signal until it is equal to the high vibration level portion of said composite signal; and
   (4) transmitting the amplitude adjusted low resolution component of said composite signal to transducer means operably connected to said high resolution geophone whereby the high vibration level portion of the composite signal detected by said high resolution geophone is cancelled out by said amplitude adjusted low resolution component of said composite signal such that the signal output of the high resolution geophone does not contain high vibration levels.

5. The method of claim 1 further characterized in that said low resolution component of said composite signal is subtracted from said composite signal by:
   (1) detecting all vibrational levels of said composite signals;
   (2) transmitting said composite signal to summing means while simultaneously:
      (a) isolating a low resolution component of said composite signal;
      (b) adjusting the amplitude of the low resolution component of said composite signal until it is equal to the high vibrational level portion of said composite signal; and (c) transmitting said amplitude adjusted low resolution component of said composite signal to summing means whereby the high vibration level energy portion of said composite signal is cancelled out.

References Cited

UNITED STATES PATENTS

| | | | |
|---|---|---|---|
| 1,959,004 | 5/1934 | Owen | 340—15.5 X |
| 2,390,187 | 12/1945 | Sharpe | 181—.5 |
| 2,634,398 | 4/1953 | Piety | 340—15.5 X |
| 2,688,124 | 8/1954 | Doty et al. | 340—15.5 |
| 2,808,577 | 10/1957 | Crawford et al. | 340—15.5 |
| 3,195,676 | 7/1965 | Eisler et al. | 340—15.5 X |
| 3,344,395 | 9/1967 | Silverman et al. | 340—15.5 |

RODNEY D. BENNETT, *Primary Examiner.*

D. C. KAUFMAN, *Assistant Examiner.*